(12) United States Patent
Mueller et al.

(10) Patent No.: US 12,153,416 B2
(45) Date of Patent: Nov. 26, 2024

(54) MOBILE COMMUNICATION TERMINAL DEVICE OPERATION OF ROBOT TERMINAL

(71) Applicant: Intel Corporation

(72) Inventors: Matthias Mueller, Munich (DE); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 16/935,251

(22) Filed: Jul. 22, 2020

(65) Prior Publication Data

US 2020/0348664 A1 Nov. 5, 2020

(51) Int. Cl.
*G05D 1/00* (2024.01)
*G01C 21/34* (2006.01)
(Continued)

(52) U.S. Cl.
CPC ....... *G05D 1/0016* (2013.01); *G01C 21/3407* (2013.01); *G05D 1/0022* (2013.01); *G05D 1/0231* (2013.01); *G06N 3/08* (2013.01)

(58) Field of Classification Search
CPC .. G05D 1/0016; G05D 1/0276; G05D 1/0234; G05D 1/0219; G05D 1/0221; G05D 1/0088; G05D 2201/02; G05D 1/0231; G05D 1/0022; G06N 3/082; G06N 3/084; G06N 3/045; G06N 3/08; G01C 21/34; G01C 21/3407
See application file for complete search history.

(56) References Cited

U.S. PATENT DOCUMENTS 10,036,639 B1 * 7/2018 Cox ................. G01S 19/42
2018/0292825 A1 * 10/2018 Smolyanskiy ....... G06V 10/764
(Continued)

FOREIGN PATENT DOCUMENTS

EP 3508935 A1 7/2019
WO WO-2016148784 A1 * 9/2016 ............. A63H 27/12

OTHER PUBLICATIONS

European Search Report issued for the corresponding European Patent Application No. 20207742.6, dated May 11, 2021, 7 pages (For informational purposes only).
(Continued)

*Primary Examiner* — Anne Marie Antonucci
*Assistant Examiner* — Wesam Almadhrhi
(74) *Attorney, Agent, or Firm* — VIERING, JENTSCHURA & PARTNER MBB

(57) ABSTRACT

A mobile communication terminal device may include one or more image sensors, configured to generate image sensor data representing an environment of the mobile communication terminal device; one or more processors, configured to receive the image sensor data from the one or more image sensors; implement at least one artificial neural network to receive the image sensor data as an artificial neural network input and output an artificial neural network output representing a detected environment parameter of the environment of the mobile communication terminal; determine a navigation instruction based on the artificial neural network output; and send a signal representing the navigation instruction to a robot terminal via a communication interface.

18 Claims, 9 Drawing Sheets

(51) Int. Cl.
    *G05D 1/02*     (2020.01)
    *G06N 3/08*     (2023.01)

(56) References Cited

U.S. PATENT DOCUMENTS

| | | | |
|---|---|---|---|
| 2019/0047493 A1* | 2/2019 | Chierichetti | G01P 15/0802 |
| 2021/0117701 A1* | 4/2021 | Janardhana | G06F 18/24 |
| 2021/0191424 A1* | 6/2021 | Drayna | G08G 1/096775 |

OTHER PUBLICATIONS

Oros et al; "Smartphone based Robotics: Powerful, Flexible and inexpensive Robots for Hobbyists, Educators, Students and Researchers"; Venter of Embedded Computer Systems university of California, Irvine; Nov. 26, 2013; 11 pages; CESC Technical Report 13-16.

Oros et al; "Neuromodulation, Attention and Localization Using a Novel Android Robotic Platform"; IEEE International Conference on Development and Learning and Epigenetic Robotics (ICDL), San Diego, CA; 2012; pp. 1-6.

"Wheelphone"; http://www.wheelphone.com/wiki.html; Feb. 28, 2018. Retrived from https://comma.ai on Jul. 22, 2020.

Oros et al: "Android™ Based Robotics: Powerful, Flexible and Inexpensive Robots for Hobbyists, Educators, Students and Researchers"; Cognitive Anteater Robotics Laboratory; https://www.socsci.uci.edu/%7Ejkrichma/ABR/abr_background.html; Nov. 2015; 36 pages.

"Hacking A RC Car to Control It Using An Android Device"; https://www.hackster.io/mjrobot/hacking-a-rc-car-to-control-it-using-an-android-device-7d5b9a; Oct. 28, 2016; 13 pages; MJRoBot; Avnet Community.

XCraft; "PhoneDrone Ethos—A whole new dimension for your smartphone"; https://www.kickstarter.com/projects/137596013/phonedrone-ethos-a-whole-new-dimension-for-your-sm; Apr. 1, 2020.

* cited by examiner

MOBILE COMMUNICATION TERMINAL DEVICE OPERATION OF ROBOT TERMINAL

TECHNICAL FIELD

Various aspects of this disclosure generally relate to autonomous or semi-autonomous operation of a robot terminal using one or more sensors and one or more processors of a mobile communication terminal.

BACKGROUND

Robots are increasingly being developed for ever-expanding variety of uses and tasks. Despite their increasing applications, many robots are prohibitively expensive. Even simple robots often require a plurality of sensors and processors to perceive data in the robots' environment and make navigation decisions based on this data. These sensors and processors increase the overall cost of the robot, often rending the robot unaffordable for its intended use.

Mobile communication terminals (e.g. smartphones, tablet computers, wearables, etc.) have become almost ubiquitous within daily life. Many mobile communication terminals include a plurality of sensors that can be used to perceive an environment of the mobile communication terminal, as well as a plurality of processors to process the resulting sensor data.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
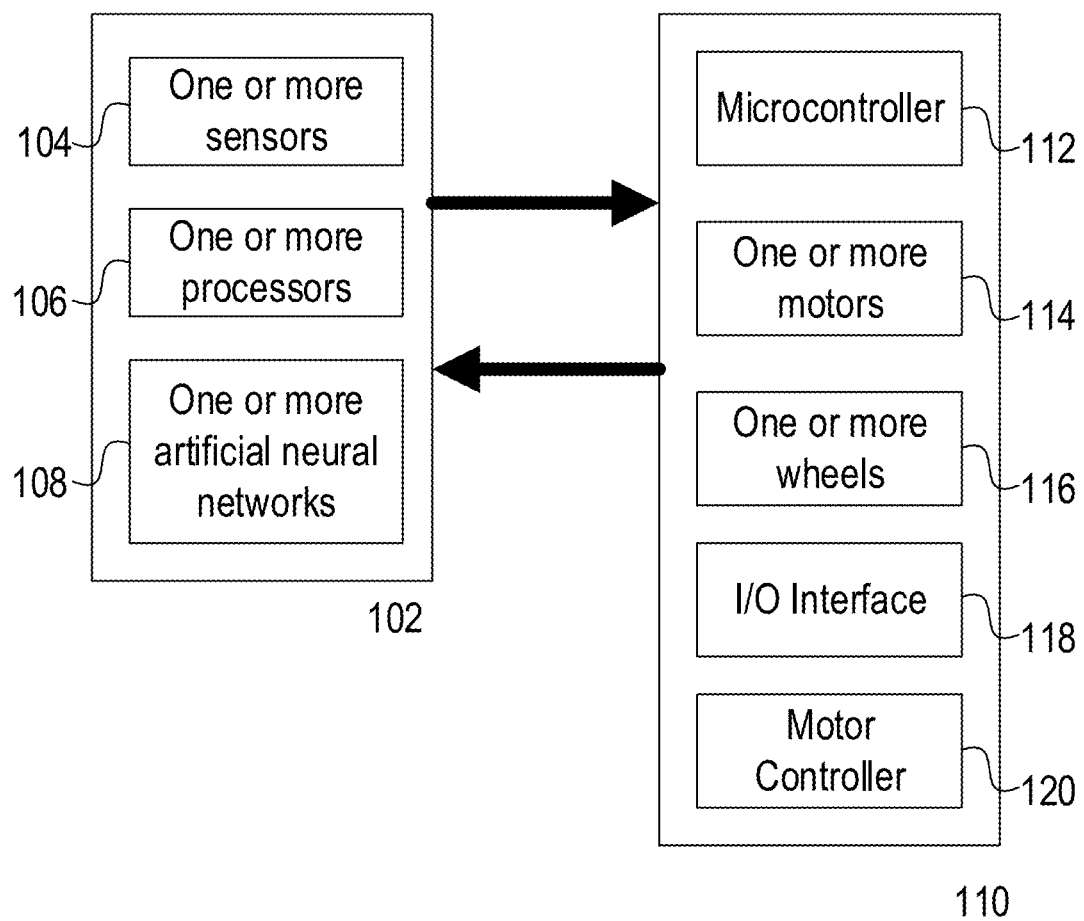
FIG. 1 depicts a mobile communication terminal and a robot terminal.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Various embodiments herein may utilize one or more machine learning models to perform or control functions of the vehicle (or other functions described herein). The term "model" may, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, Light Detection and Ranging (LIDAR) data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm). Any emphasis placed herein on a particular form of artificial neural network is not intended to exclude a possible implementation with another form of artificial neural network.

The term "mobile communication terminal" is used herein to describe a mobile device that includes one or more sensors that are configured to obtain sensor information about an environment of the mobile communication terminal and to output sensor data representing the detected sensor information, and one or more processors that are configured to receive the sensor data and process the sensor data according to one or more instructions, one or more algorithms, one or more artificial neural networks, or any combination thereof. The one or more sensors may include one or more image sensors, which may be one or more cameras (e.g., still, video, depth, stereoscopic, etc.), one or more radar sensors, one or more LIDAR sensors, or any other sensor to obtain a model of an environment of the mobile communication terminal. The mobile communication terminal may include, but is not limited to, a smartphone, a tablet computer, a handheld computer, a smartwatch, or a wearable device. According to an aspect of the disclosure, the mobile communication terminal processes the sensor data (e.g., via an artificial neural network) locally on the mobile communication terminal rather than by sending the data to a remote device or server for processing.

The term robot terminal is used herein to describe a robot that relies on a mobile communication terminal for sensor data and processing of the sensor data, such as processing of the sensor data according to an artificial neural network. The robot terminal may locomote using one or more wheels, one or more propellers, one or more paddles, one or more tracks (e.g. a tank format), or otherwise. The robot terminal may include one or more motors to turn the one or more wheels, one or more propellers, and/or one or more tracks. The robot terminal may include one or more simple processing units, such as a microcontroller and/or a motor controller. To the extent that the robot terminal is operated using navigation instructions that are generated based on an artificial neural network, the robot terminal's processors are not generally expected to carry out the functions of the artificial neural network, but rather the artificial neural network is expected to be implemented on the mobile communication terminal, and the resulting navigation instruction is expected to be sent to the robot terminal (e.g. to the microcontroller of the robot terminal). The robot terminal is not necessary expected to be devoid of sensors; for example, is it disclosed herein that the robot terminal may include one or more speed sensors. However, the robot terminal may predominately use sensor information obtained from and/or processed by the mobile communication terminal (e.g. image sensor data, accelerometer data, position data, etc.). Of note, it is expected that the mobile communication terminal is physically connected to the robot terminal in some manner. This may be achieved, for example, by incorporating a mount for the mobile communication terminal on the robot terminal. Alternatively, it may be achieved by simply setting the mobile communication terminal on the robot terminal. However the physical connection is achieved, it is expected that the mobile communication terminal travels with the robot terminal. The principles and method disclosed herein do not generally anticipate the mobile communication terminal remaining stationary while the robot terminal locomotes.

Current robots often rely on expensive computational platforms and high-quality sensors and communication capabilities to perform robust perception for task control. Given the price of these computational platforms and sensors, robots using these components may be prohibitively expensive. Many mobile communication terminals already include significant processing ability and high-quality sensors. Herein is described a system that leverages a mobile communication terminal to equip robots with extensive sensor suites, computational abilities, state-of-the-art communication channels, and access to a thriving software ecosystem. That is, the mobile communication terminal is used as the primary computational resource for a low-cost robot terminal.

One or more processors (e.g. mobile communication terminal processors) may be combined with a robot terminal (e.g. an inexpensive robot body) to realize an independently functioning and/or autonomous robot. By utilizing sensors and processors already present in an external device (e.g. a mobile communication terminal), the robot terminal may be inexpensively designed. This inexpensive design may render the robot more accessible to a variety of populations and may better enable affordable reproductions at scale.

By utilizing available processors of a mobile communication terminal, robust perception and logic control may be achieved. The mobile communication terminal may be connected to the robot terminal by means of an input/output (I/O) interface. According to an aspect of the disclosure, the I/O interface may use a custom, asynchronous communication protocol, which may minimize data transfer to allow scaling of communication for simple and/or slow channels. This may permit the robot terminal to operate, for example, using a low-power, low-frequency microcontroller for communication and low-level control.

FIG. 1 depicts a mobile communication terminal 102 and a robot terminal 110, according to an aspect of the disclosure. The mobile communication terminal 102 may include one or more sensors 104, which may be configured to receive sensor information representing an environment of the mobile communication terminal and to output sensor data representing the sensor information. The mobile communication terminal 102 may include one or more processors 106, which may be configured to receive the image sensor data from the one or more image sensors 104; implement at least one artificial neural network 108 to receive the image sensor data as an artificial neural network input and output an artificial neural network output representing a detected environment parameter of the environment of the mobile communication terminal 102; determine a navigation instruction based on the artificial neural network output; and send a signal representing the navigation instruction to the robot terminal 110 via a communication interface. The mobile communication terminal 102 may include one or more artificial neural networks 108, which may be configured to receive the image sensor data as an artificial neural network input and output an artificial neural network output representing a detected environment parameter of the environment of the mobile communication terminal.

The robot terminal 110 may include one or more microcontrollers 112, which may be configured to receive a navigation instruction from the mobile communication terminal 102 and to output one or more signals to control one or more motors 114 of the robot terminal 110. The one or more motors 114 of the robot terminal may be connected to and/or control one or more wheels (alternatively, one or more propellers, one or more paddles, one or more tracks, etc.) 116 of the robot terminal to cause the robot terminal to locomote, turn, maneuver, or otherwise. According to an aspect of the disclosure, the one or more motors 114 may be connected to one or more paddles, one or more propellers, or otherwise, whether in addition to or instead of the one or more wheels 116, such that the one or more motors cause the one or more paddles, one or more propellers, or otherwise to move, thereby resulting in locomotion, turning, and/or maneuvering of the robot terminal. The robot terminal 110 may include one or more input output interfaces 118, which may be configured to receive a signal from the mobile communication terminal 102 (e.g. the navigation instruction) and/or to send a signal to the mobile communication terminal 102 (e.g. feedback, local sensor information, or otherwise). The robot terminal 110 may include a motor controller 120, which may be a controller circuit (e.g. controller, microcontroller) configured to receive a signal representing an instruction and to output an electrical signal to power one or more motors. Depending on the configuration, the microcontroller 112 and the motor controller 120 may be implemented in the same controller or microcontroller.

According to an aspect of the disclosure, the one or more sensors 104 of the mobile communication terminal 102 may include one or more image sensors. In this way, the one or more image sensors may be configured to obtain image sensor information representing an environment of the mobile communication terminal and to output image sensor data representing the image sensor information. The one or more image sensors may be any kind of image sensors whatsoever, including, but not limited to, one or more cameras, one or more LIDAR sensors, one or more radar sensors, one or more ultrasound sensors, or any combination thereof.

Figure 2:
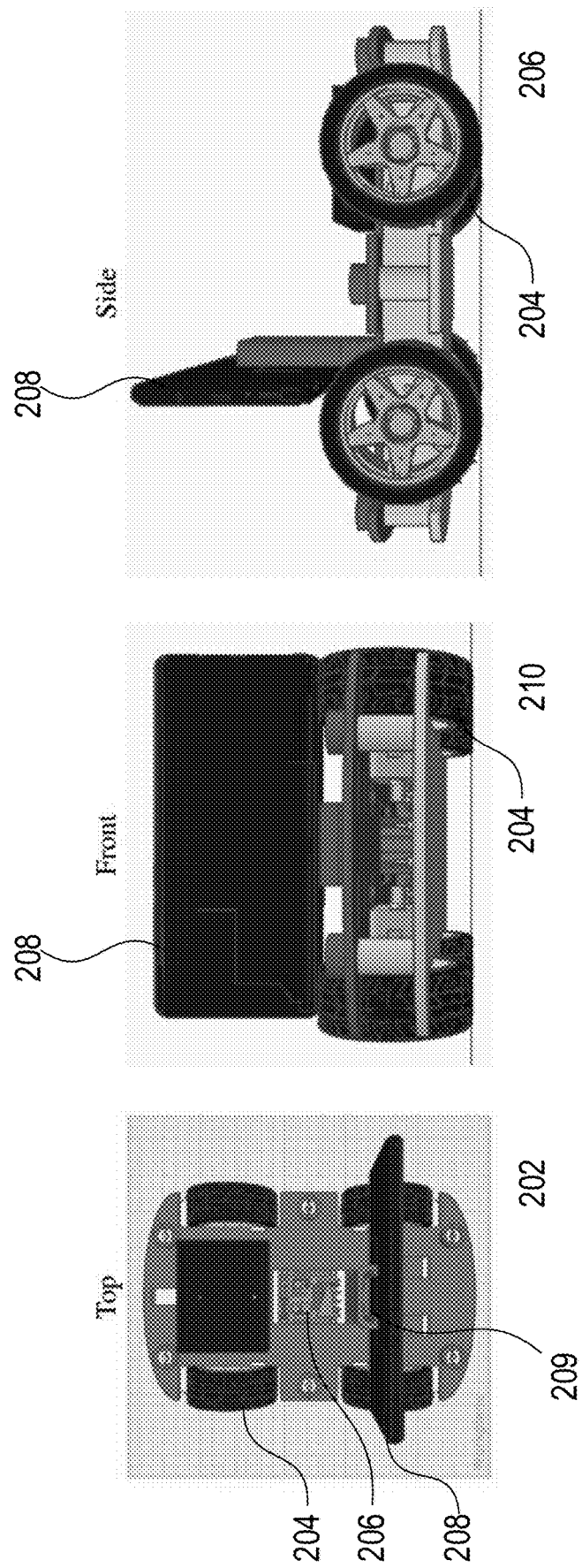
FIG. 2 depicts an exemplary representation of a robot terminal, according to an aspect of the disclosure.

FIG. 2 depicts a representation of a robot terminal, according to an aspect of the disclosure. In the leftmost image 202, a top view of the robot terminal is shown. In this image, the one or more wheels 204 are depicted. The robot terminal may include a microprocessor 206. The robot terminal may be connected to a mobile communication terminal 208, which may be mounted to the robot terminal such that the mobile communication terminal and the robot terminal move in tandem. The mobile communication terminal may optionally be mounted to the robot terminal via a mobile communication terminal mount 209.

Figure 3:
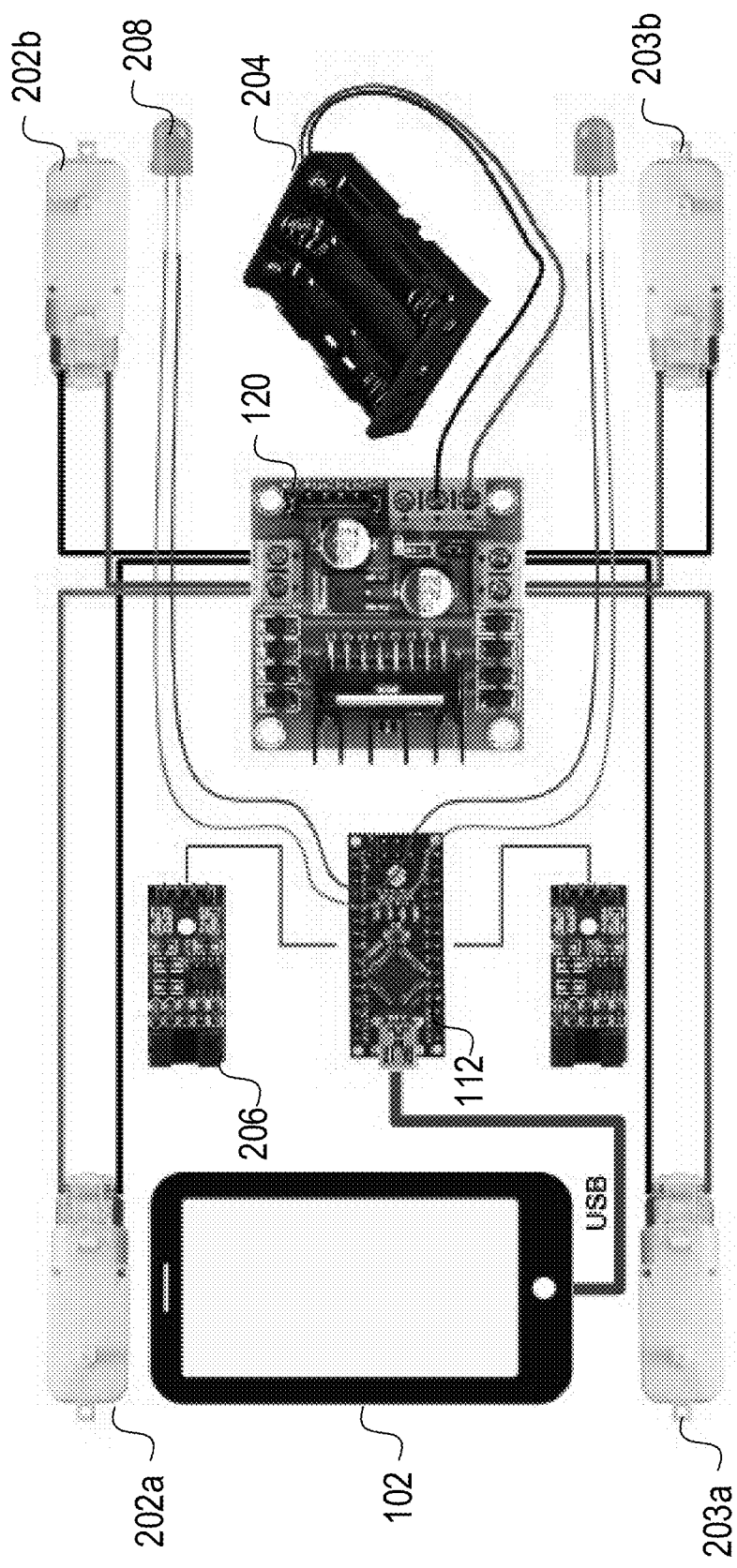
FIG. 3 shows an exemplary electrical configuration of the mobile communication terminal and robot terminal, according to an aspect of the disclosure.

FIG. 3 depicts an electrical configuration of the mobile communication terminal and robot terminal, according to an aspect of the disclosure. In this example, the robot terminal includes a microcontroller 112, which may receive one or more signals from the mobile communication terminal (e.g. such as through the I/O interface) and may send one or more signals to operate the one or more motors in response to the signal received from the mobile communication terminal. The microcontroller 112 may be any kind of controller that may be desired for the implementation.

Assuming a configuration in which four motors operate four-wheels, the motors may be configured to operate synchronously as a group of four motors, in tandem (e.g. two groups of two motors, both motors in the group operating in tandem but the two groups operating independently from one another), or each of the four motors may operate fully independently. In this exemplary configuration, motors 202a and 202b are connected to the same microcontroller output and operate synchronously (e.g. in tandem), whereas motors 203a and 203b are connected to another microcontroller output and operate synchronously (e.g. in tandem).

The robot terminal may further include one or more batteries, which may optionally be arranged within a battery pack. The batteries may be connected to power terminals of the motor controller 120 to provide power to the motors as needed. Although any battery configuration may be selected according to the needs of a particular implementation, and exemplary battery configuration may include three USB-rechargeable 18650 Lithium cells connected in series, providing a voltage between 9.6V and 12.6V depending on their state-of-charge (SOC).

The robot terminal may include a microcontroller 112, which may be configured to receive a navigation instruction from the mobile communication terminal 102 and to output one or more instructions for control of the one or more motors. The microcontroller 112 may include a port for a wired connection to the mobile communication terminal 102, such as a USB port. This wired connection may provide a serial communication between the mobile communication terminal and the microcontroller 112. According to an aspect of the disclosure, this connection may also provide electrical power from the mobile communication terminal 102 to the microcontroller 112. The microcontroller 112 may output to at least the motor controller 120 (connection not depicted) which may be achieved using any connection means suitable for the implementation. According to some aspects of the disclosure, the microcontroller and the motor controller may be a single device, which received a navigation instruction from the mobile communication terminal and sends signals to the motors to control motor operation.

According to an aspect of the disclosure, the robot terminal may include one or more speed sensors. Although the speed sensors may be configured in any way desirable for the implementation, and according to one aspect of the disclosure, the speed sensors may be configured using one or more optical sensors and one or more light generating devices 208 (other light generating device not labeled). For example, the robot terminal is depicted herein with two speed sensors (e.g. LM393-based speed sensors having optical sensors) 206 (other sensor not labeled), which are connected as input to two of the digital pins. The two front wheels may each be equipped with a disk (not shown) that rotates with the wheel/motor and interrupts the optical signal. These interruptions may be detected and counted by the speed sensor 206 and/or the microcontroller 112, providing a wheel odometry signal. According to an aspect of the disclosure, two further digital pins may be used as outputs to switch the light generating devices on and off, thereby providing a visual means for the robot to communicate with its environment. According to another aspect of the disclosure, the analog pins may be connected with the batteries 204 to measure the battery voltage through a voltage divider. Finally, four PWM pins may be connected to the motor controller, which may allow for the speed and direction of the motors to be adjusted according to the control commands received from the smartphone.

According to an aspect of the disclosure, the robot terminal may further include a mobile communication terminal mount (not pictured). Because some sensors of the mobile communication terminal must be exposed for appropriate function (e.g. the camera needs to observe the environment, GPS will degrade when shielded, etc.), it may be beneficial to include a mount to hold the smartphone in a desired position (e.g. upright) relative to the robot terminal. The mount may take any form whatsoever. The mount may optionally include circuitry and/or cable connections for a wired connection between the smartphone 102 and the microcontroller 112. If the mount does not include such circuitry and/or cable connections, the data link between the mobile communication terminal and the robot terminal may be established through circuitry and/or cable connections that are not part of the mount, or through one or more wireless connections (e.g. Bluetooth).

Figure 4:
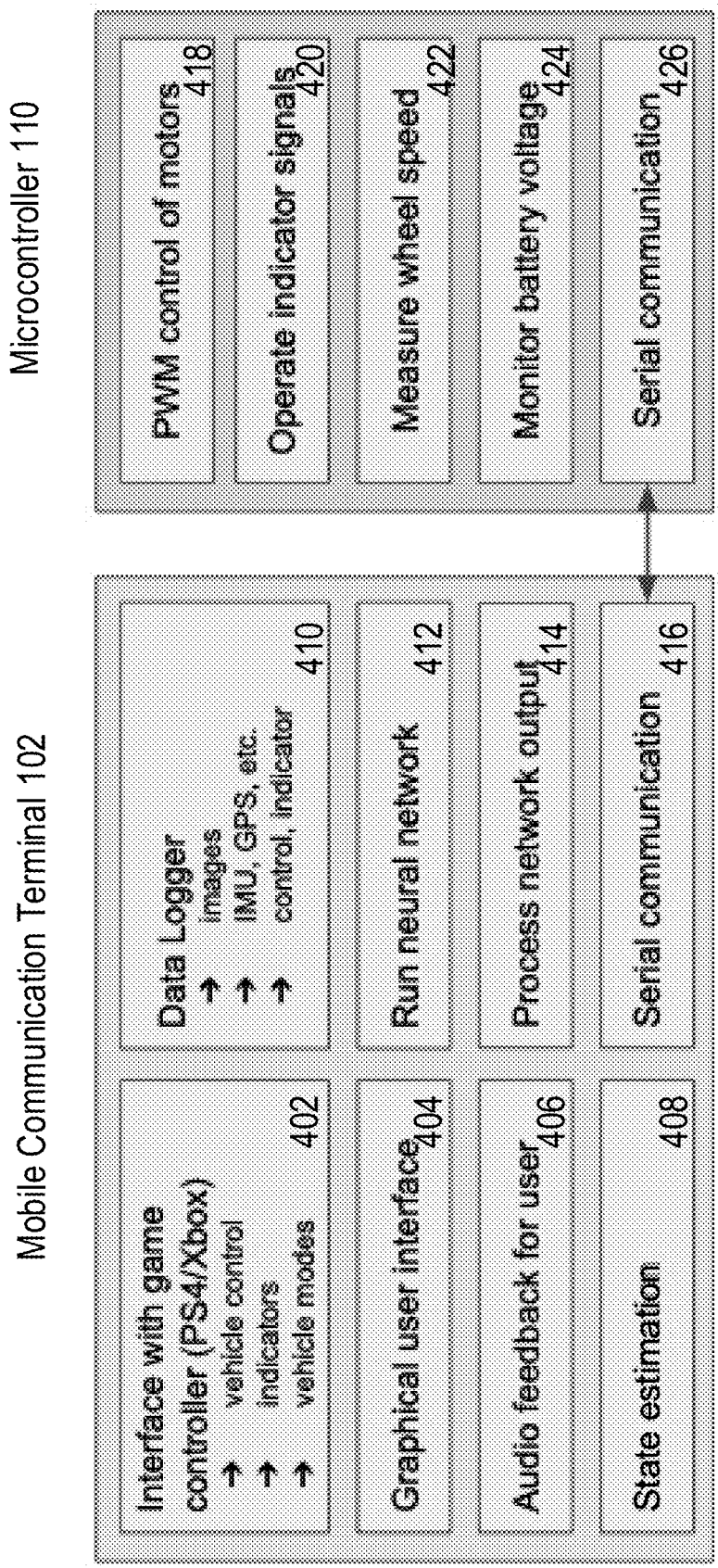
FIG. 4 depicts two components of a software stack, according to an aspect of the disclosure.

According to an aspect of the disclosure, the software stack may include two components, as shown in FIG. 4. The first component may be an application that runs on the mobile communication terminal (e.g. an Android application, an iOS application, etc.). This mobile communication terminal application may provide an interface for an operator (e.g. a human operator), collect datasets, and may run the higher-level perception and control workloads. This application may interface with one or more controllers (e.g. game controllers, joysticks, or otherwise) 402 to receive a steering command for comparison with an artificial neural network environment parameter for training of an artificial neural network. The application may include a graphical user interface 404 for displaying information on a display and/or receiving commands from a display or other device. The application may include audio feedback for a user 406, such as an application to control one or more speakers to provide audio information. The application may include state estimation 408, which may be configured to estimate a state of the mobile communication terminal and/or the robot terminal, such as a position and/or orientation) as the mobile communication terminal and/or the robot terminal move throughout the world. The application may include a data logger 410, which may be configured to receive and/or log image data, inertial measurement unit (IMU) data, positioning data (e.g. GPS data), control data, indicator data, or otherwise. The application may be configured to run or implement one or more artificial neural networks 412. The application may be configured to process artificial neural network output 414. The application may be configured to send signals to or receive signals from a microcontroller 110 via a communication port such as, for example, a serial communication port 416.

The second component may be an application that runs on the microcontroller. This microcontroller application may handle, for example, low-level actuation and/or measurements, such as wheel odometry and battery voltage. The microcontroller application may be configured to control the motors of the robot terminal 418, such as, for example, using pulse width modulation (PWM) control, in response to a navigation instruction received from the mobile communication terminal. The microcontroller application may be configured to operate indicator signals 420, such as to turn lights on and off. The microcontroller application may be configured to measure wheel speed 422, such as with the speed sensors. The microcontroller application may be configured to monitor battery voltage 424 such as by measuring voltage at a voltage divider. The microcontroller application may be configured to communicate with the mobile communication terminal via a communication port 426, such as, for example, a serial communication port. The mobile communication terminal application and the microcontroller may communicate via a wired or wireless link (e.g. a serial communication link, a Bluetooth link, etc.).

According to an aspect of the disclosure, the mobile communication terminal and the robot terminal may communicate with one another using a custom communication interface. It may be desired to transmit and process control signals with as little latency as possible to enable the robot terminal to rapidly react to the high-level computations of the mobile communication terminal (e.g. rapidly carry out the navigation instruction). In this manner, the sending device may discretize and send, e.g. asynchronously, the control signals as individual bytes per control channel. On the receiving end, the receiving device may receive and process the bytes asynchronously. This may avoid blocking the microprocessor, which may also need to read sensors and output PWM signals for the actuators. The mobile communication terminal may aggregate the local sensor readings and send them as one message, such as at fixed time intervals.

Figure 5:
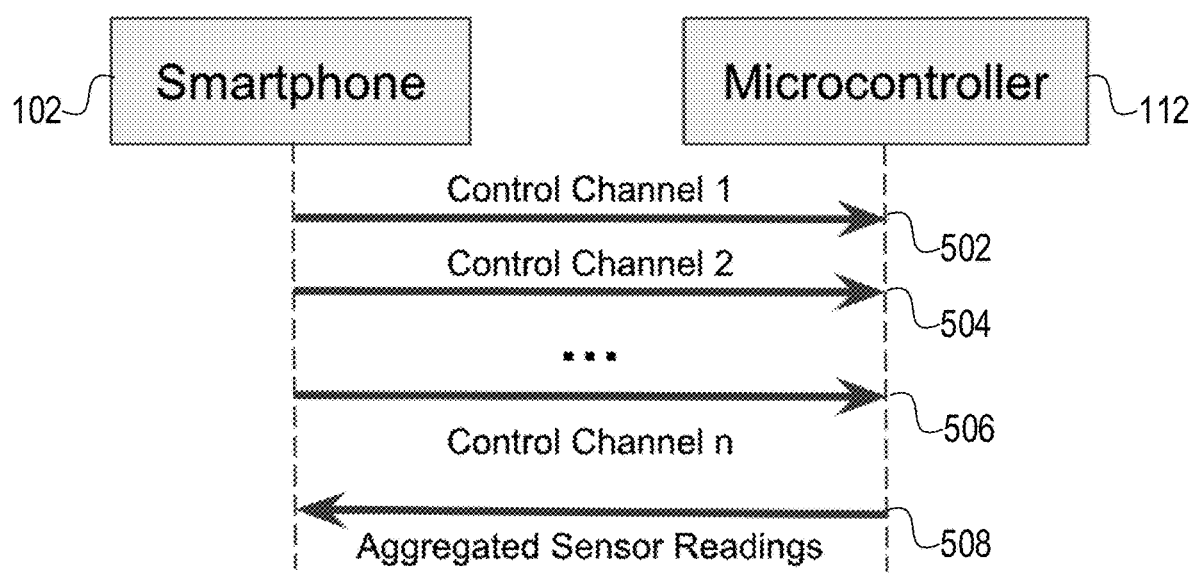
FIG. 5 depicts the communication between the mobile communication terminal and a microcontroller of the robot terminal, according to an aspect of the disclosure.

FIG. 5 depicts communication between the mobile communication terminal 102 and the microcontroller 112, according to an aspect of the disclosure. The mobile communication terminal 102 and the microcontroller 112 may be configured to communicate in a wired or wireless fashion. According to one aspect of the disclosure, the mobile communication terminal 102 and the microcontroller 112 may be connected via a serial connection. The mobile communication terminal 102 may transmit discretized control signals as individual bytes in a series of control channels labeled herein as control channel one 502 through control channel n 506. These discretized signals may be received by the microcontroller 112 and interpreted via the microcontroller application. The microcontroller 112 may receive sensor data from one or more sensors (e.g. speed sensors) which may be sent from the microcontroller 112 to the mobile communication terminal 102, e.g. in an aggregated sensor reading package 508.

According to another aspect of the disclosure, the user interface may include visual and auditory feedback for interaction with the robot. Using, for example, Bluetooth communication to interface with a controller, such as a joystick or a game console controller (e.g. PS4, Xbox), the received information from the game console controller may be used to provide remote controlled navigation signals for the robot for data collection, which may be useful in training the artificial neural network. To collect data, such as demonstrations for imitation learning, game console input can optionally be used to control the robot and use the buttons to trigger functionalities such as toggling control modes, logging, running a neural network, etc. The graphical user interface may be configured to provide a camera feed and buttons to toggle data logging, control modes, and serial communication, such as by providing such data on a screen of a game console. The game console controller may also permit switching between different neural networks to control the vehicle and may provide relevant information such as image resolution, inference time, and predicted controls. According to an aspect of the disclosure, voice feedback may be integrated for operation via the game controller.

According to an aspect of the disclosure, any components listed herein may include a data logger to collect datasets with respect to the mobile communication terminal and/or the robot terminal. The data logs may optionally include, but are not limited to, readings from following sensors: camera, gyroscope, accelerometer, magnetometer, ambient light sensor, barometer, or any combination thereof. Using the application programming interface, RGB images, angular speed, linear acceleration, gravity, magnetic field strength, light intensity, atmospheric pressure, latitude, longitude, altitude, bearing, speed, or any combination thereof may be obtained or derived from the mobile communication terminal sensors, or from the mobile communication terminal sensors in combination with one or more sensors of the robot terminal. Both wheel odometry data and battery voltage may be obtained from the robot terminal and may be transmitted to the mobile communication terminal. Furthermore, the mobile communication terminal and/or the microcontroller on the robot terminal may optionally record control commands received from a connected game controller.

Using the techniques and devices described above, the computational power of the mobile communication terminal may be leveraged to process sensory input and compute the robot terminal's actions in real time. The robot terminal may operate according to one or more motion planning algorithms. Additionally or alternatively, the robot terminal may operate based on one or more learning-based approaches, which may allow for a unified interface.

Figure 6:
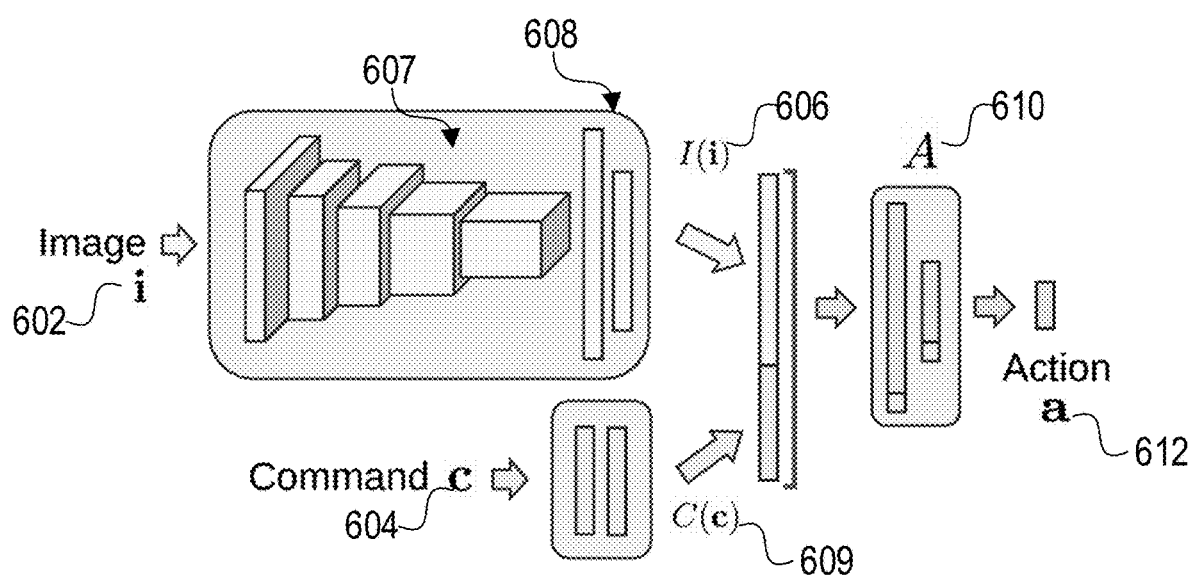
FIG. 6 depicts a network architecture for a convolutional artificial neural network.

FIG. 6 depicts a network architecture for a convolutional artificial neural network as described herein. According to an aspect of the disclosure, the artificial neural network may receive an image i 602 and a command c 604 as inputs. The image i 602 may be an image from one or more image sensors of the mobile communication terminal. The command c 604 may be a navigation command that is received from a game console controller, such as a controller operated by a human user (e.g. remote control of the robot terminal for training purposes). The image i 602 and the command c 604 may be processed via an image module I(i) 606 and a command module C(c) 608. According to an aspect of the disclosure, the image module may include a plurality (e.g. 1-5, 5, more than 5) convolutional layers 607 (e.g., 5 layers with 32, 64, 96, 128 and 256 filters), each with a stride of 2, a kernel size of 5 for the first layer, and 3 for the remaining layers. The artificial neural network may apply one or more exponential linear unit (ELU) activation functions, batch-normalization, and a dropout (e.g. 20% dropout) (not pictured) after each convolutional layer. The artificial neural network may flatten and process the output by two fully-connected layers with 128 and 64 units 608. The artificial neural network may implement the command module as an MLP with 16 hidden units and 16 output units 609. The outputs of the image module and the command module may be concatenated and fed into the control module, A 610. In this manner, the sensor data 602 is input into the convolutional artificial neural network and processed as described above with respect to 606, 607, and 608, which may also be implemented as an MLP. The control module 610 may have, for example, two hidden layers with 64 and 16 units and then may linearly regress to the action vector a 612. The artificial neural network may then concatenate the command c 604 with the hidden units for added robustness. The artificial neural network may apply a dropout (e.g. 50% dropout) after all fully-connected layers.

According to an aspect of the disclosure, the artificial neural network may use an image input size of 256×96, resulting in 1.3M parameters. At the same input resolution, one artificial neural network system utilized in experiments had 9.6M parameters and another artificial neural network system had 10.7M parameters. That is, the artificial neural network described herein is one order of magnitude smaller than existing artificial neural network systems and is able to operate in real-time on most mobile communication terminals. In experiments, the average inference time of a variety of standard mobile communication terminals was between 19 ms and 32 ms. Further improvement in processing speed may be possible by quantization of the network weights and/or by utilizing alternative artificial neural network implementation software.

When training end-to-end driving policies on autonomous navigation datasets, the label imbalance may present a significant challenge. Most of the time, the vehicle operates in a straight line, resulting in many images with the same label. One common approach is to re-sample the dataset or carefully craft individual batches during training; however, this usually requires a fixed dataset or significant computational overhead. If the dataset changes dynamically or arrives as a continuous stream, these methods may not be feasible. Rather, the problem of label imbalance can be solved with a weighted loss.

According to an aspect of the disclosure, the loss function can be defined to place weight proportionally with steering angle. That is, the greater that the steering angle is, the more critical the loss function considered the maneuver to be. Otherwise stated, the loss function may assign little weight to maneuvers with a small steering angle (e.g. a steering angle of 0 degrees, such as a steering angle corresponding to forward motion), whereas the loss function may assign significantly greater weight to maneuvers with a greater steering angle (e.g. a steering angle of 40 degrees, such as during a turning maneuver). Hence, the loss function may use a loss with a weighted term proportional to the steering angle combined with a standard mean squared error loss on the entire action vector to ensure that throttle is learned as well:

$$\mathbb{L} = w^2 \cdot MSE(s^t, s^p) + MSE(a^t, a^p) \quad (1)$$

where $a^t$ is the target action, $a^p$ is the predicted action, $s^t$ is the target steering angle, and $w=(st+b)$ with a bias b to control the weight of samples with zero steering angle. If the vehicle uses differential steering, the action vector may include a two-dimensional control signal a=(al, ar), corresponding to throttle for the left and right wheels. In this case, microcontroller and/or the mobile communication terminal may compute the steering angle as s=al−ar.

According to an aspect of the disclosure, noise injection may be used to improve a training the artificial neural network. Training may be performed using a driving dataset, such as a data set from a human controlling the robot terminal via a game controller. Since the mobile communication terminal is likely to have only one smartphone camera for a data feed, the training procedure may utilize noise that is injected during data collection and then record the recovery maneuvers executed by a human operator. This injection of noise may improve the training and make the artificial neural network more robust.

According to an aspect of the disclosure, the noise may be constructed as follows. The one or more processors of the mobile communication terminal (or, alternatively, of any processors performing the artificial neural network training) may first determine the noise by sampling from a uniform probability distribution within a specified range and randomly selecting the direction of the noise. The noise can then be initialized to zero and incremented gradually by randomly sampling values for the noise strength throughout the noise duration. This process may generate random and diverse noise patterns. The human operator may compensate for this artificially injected noise by steering the robot terminal. That is, the noise may render the mobile communication terminal less able to reach an ideal driving instruction, and thus a driving operation of the robot terminal may need to be corrected by a human operator. A divergence between the driving operation as controlled by the artificial neural network and the driving operation as controlled by the human operator via the game console controller may be recorded and analyzed. This divergence may be utilized to train the artificial neural network. As a result, actuation noise is simulated and a robot navigation policy that can automatically recover from noise (e.g. noise caused from low-cost sensors or from low-cost controllers) is learned.

Although FIG. 6 depicts the convolutional artificial neural network as including a command 604, the artificial neural network may operate to determine the environment parameter and thus be a basis of the navigation instruction without receiving the command 604. That is, the command 604, and thus the processing of the command 609, may only be relevant in training situations. Once the artificial neural network is trained, the artificial neural network may operate based on image sensor data alone, or based on image sensor data in combination with other sensor data, but without the command 604. In this manner, the sensor data 602 are input into the convolutional artificial neural network and processed as described above with respect to 606, 607, and 608. The control module 610 and the action 612 may be based on the sensor data alone, rather than the sensor data in combination with a command 604.

Figure 7:
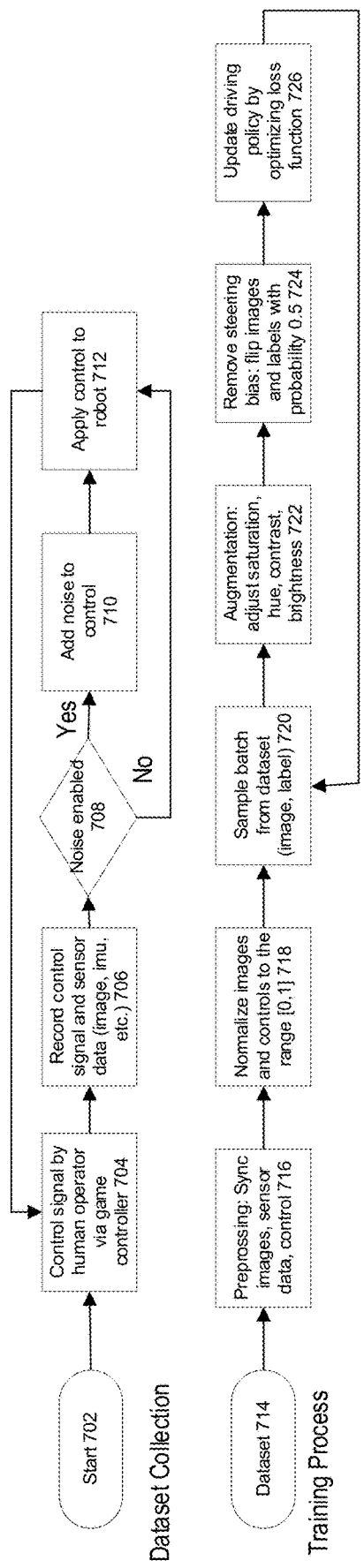
FIG. 7 depicts a flow-chart of the data collection and training process, according to an aspect of the disclosure.

FIG. 7 depicts a flow-chart of the data collection and training process, according to an aspect of the disclosure. In this figure, and upon beginning the data set collection 702, the mobile communication terminal may receive a control signal from the human operator via the game controller 704. The mobile communication terminal may record the control signal from the human controller and corresponding sensor data (e.g. image sensor data, IMU data, etc.) 706. The mobile communication terminal may determine whether noise is enabled for the training 708. If noise is enabled, the mobile communication terminal may add noise control 710 and apply the noise control 710 to the robot 712. If noise is not enabled 708, the mobile communication terminal may apply noise control 710 to the robot 712. This process may then be repeated, beginning with receiving a new control signal from the human operator 704. In the training process, the data set that is received as described above 714 may be analyzed to train the artificial neural network. Specifically, the mobile communication terminal may perform a preprocessing operation in which sensor images, sensor data, control data and otherwise are synchronized 716. The mobile communication terminal may then normalize images and controls, such as normalizing them within a range of 0 to 1 718. The mobile communication terminal may sample a batch from the data set (e.g. image data, label data) 720. The mobile communication terminal may augment the image data, such as by adjusting saturation, hue, contrast, and/or brightness 722. The mobile communication terminal may remove steering bias, such as by flipping images and labels with probability of 0.5 724. The mobile communication terminal may then update driving policy by optimizing the loss function 726.

Figure 8:
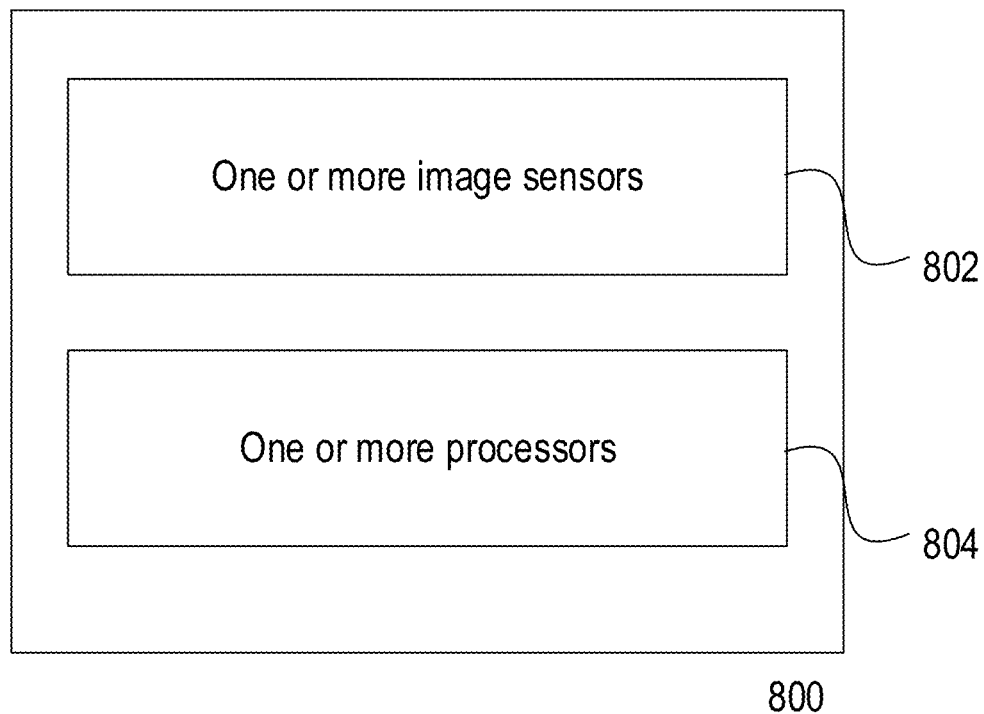
FIG. 8 depicts a mobile communication terminal according to an aspect of the disclosure.

FIG. 8 shows a mobile communication terminal 800 according to an aspect of the disclosure, the mobile communication terminal device including one or more image sensors 802, configured to generate image sensor data representing an environment of the mobile communication terminal device; and one or more processors 804, configured to receive the image sensor data from the one or more image sensors; implement at least one artificial neural network to receive the image sensor data as an artificial neural network input and output an artificial neural network output representing a detected environment parameter of the environment of the mobile communication terminal; determine a navigation instruction based on the artificial neural network output; and send a signal representing the navigation instruction to a wheeled robot terminal via a communication interface.

Figure 9:
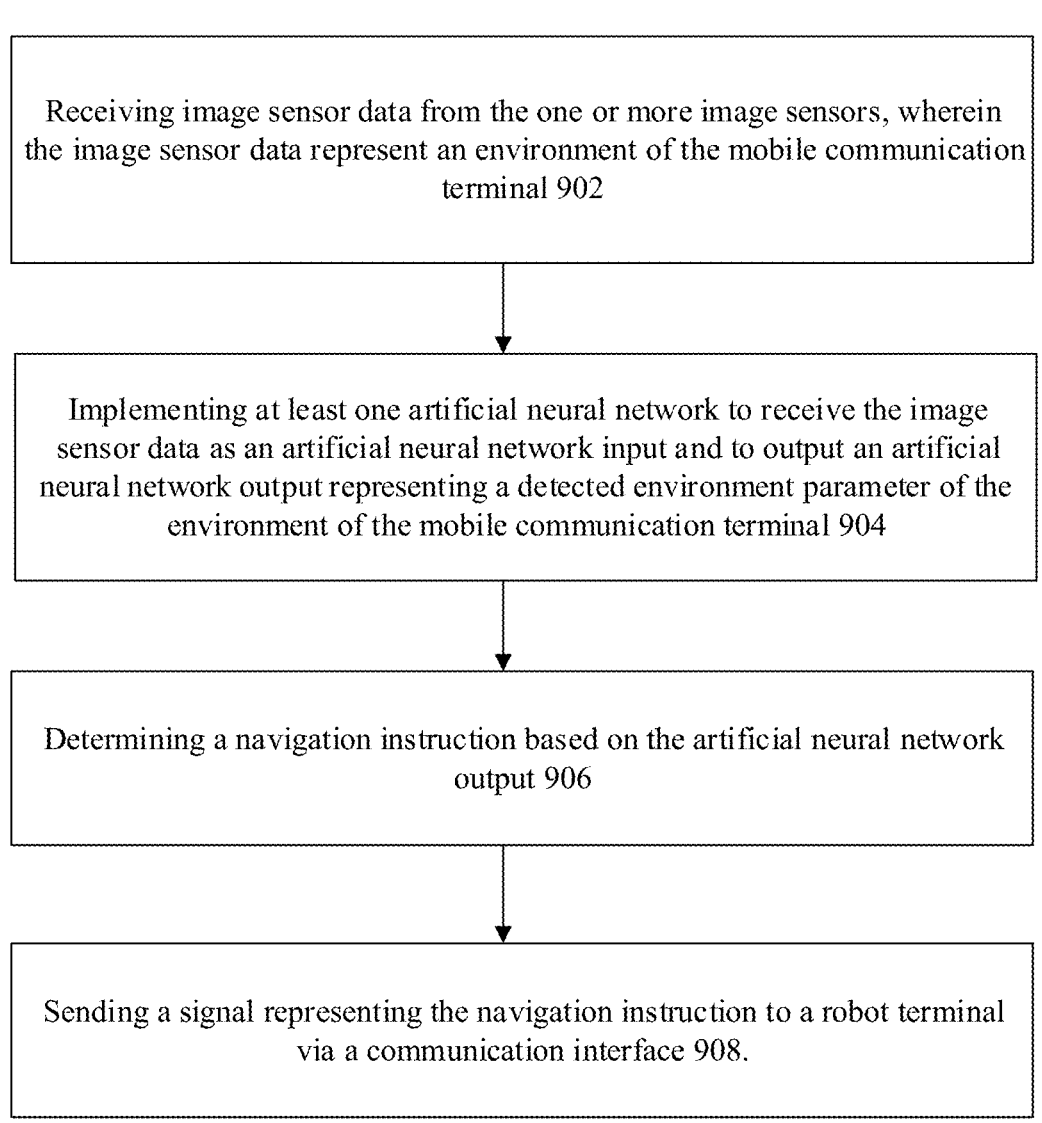
FIG. 9 depicts a method of controlling a robot terminal with a mobile communication terminal.

FIG. 9 depicts a method of navigating a robot terminal with a mobile communication terminal comprising receiving image sensor data from the one or more image sensors, wherein the image sensor data represent an environment of the mobile communication terminal 902; implementing at least one artificial neural network to receive the image sensor data as an artificial neural network input and to output an artificial neural network output representing a detected environment parameter of the environment of the mobile communication terminal 904; determining a navigation instruction based on the artificial neural network output 906; and sending a signal representing the navigation instruction to a robot terminal via a communication interface 908.

As described herein, one or more microprocessors/microcontrollers/controllers may act as a bridge between the mobile communication terminal and the robot terminal. These one or more microprocessors/microcontrollers/controllers may operate alone or in conjunction with one another (e.g. a microcontroller operating in conjunction with a motor controller). According to an aspect of the disclosure, a main task of the microcontroller may be to handle the low-level control of the vehicle and provide readings from low-level vehicle-mounted sensors. The software running on this microcontroller may be vehicle specific. That is, where the robot terminal is a wheeled robot, the microcontroller may receive the vehicle controls and indicator signals via the serial connection and may convert the controls to PWM signals for the motor controller and/or may toggle the LEDs according to the indicator signal. The microcontroller program may also keep track of the wheel rotations by counting the interrupts of the optical sensors on the wheels (e.g. the left and right front wheels). The microcontroller may calculate the battery voltage by a scaled moving average of measurements at the voltage divider circuit. These measurements may be sent back to the mobile communication terminal application (e.g. such as through the serial link).

According to an aspect of the disclosure, the robot terminal may be given a robot terminal body. The body may be designed according to any desired design. According to an aspect of the disclosure, the robot terminal body (e.g. chassis) may be 3D printed. The robot terminal chassis may include a bottom plate and a top cover. The robot terminal chassis parts may include snap-connectors that click into place. The bottom plate may feature mounting points for the motors and/or electronics. The motors (e.g. the four motors) may be affixed to the chassis (e.g. with screws). The motor controller and microcontroller may be attached to the bottom plate. The chassis may include openings for the indicator light generating devices and/or grooves for the encoder disks mounted on the front wheels. The top plate may feature a mobile communication terminal mount (e.g. a universal smartphone mount) which may exemplarily use two springs to adjust to different phones. The chassis may also include an opening for the USB cable that may connect the mobile communication terminal to the microcontroller. The chassis may further include grooves for the optical wheel odometry sensors.

According to an aspect of the disclosure, the mobile communication terminal may be configured to be mounted to the robot terminal. That is, the mobile communication terminal and the robot terminal may be configured to operate while they are in physical connection to one another. To establish this physical connection, the robot terminal may include a mobile communication terminal mount or other holder or stabilizing device, such that the mobile communication terminal may be mounted and rest on or in the robot terminal. This physical connection may be established through any holder or other design selected for the given implementation. The mount or holder may optionally include an electrical interface and/or communication interface, such that the mobile communication terminal may be electrically connected to the robot terminal (e.g. a microprocessor of the robot terminal) via the mount or holder. In this way, and for example, the mount or holder may be equipped with a USB port or other serial port to connect to the mobile communication terminal. Through this connection, the mobile communication terminal and the robot terminal may move and/or maneuver together, which may otherwise be described as co-movement of the mobile communication terminal and the robot terminal. This may permit, for example, simultaneous tilting and/or panning of the mobile communication terminal and the robot terminal.

As described herein, the one or more processors of the mobile communication terminal may be configured to implement or execute one or more artificial neural networks. The artificial neural networks may be configured according to any known structure of artificial neural network. For example, and according to one aspect of the disclosure, the artificial neural network may include a first layer or input layer, first layer or input layer further including one or more nodes, wherein the first layer or input layer is configured to input sensor data such as data of one or more image sensors. The artificial neural network may further include one or more second layers or hidden layers, the second layers or hidden layers each including one or more nodes, wherein the various nodes are configured to perform one or more weighted calculations on the sensor data according to the artificial neural network structure. The artificial neural network may further include a third layer or output layer, which may also include one or more nodes, configured to output one or more environment parameters calculated in response to receiving the image sensor data input.

According to another aspect of the disclosure, the artificial neural network may be a convolutional neural network. The convolutional neural network may be a shift invariant neural network which may be based on a shared weight architecture and one or more translation in variance characteristics. The convolutional neural network may be structured such that each neuron in one layer is connected to all neurons in the next layer. The convolutional neural network may include a convolutional layer which may include one or more learnable filters or kernels, which may include a small receptive field but extend through a full depth of an input volume. As data moves across the filters, each filter may be convolved across a width and height of an input volume, thereby computing a dot product between entries of the filter and the input, and producing a two-dimensional activation map of the filter. In this manner, the artificial neural network may be able to learn and detect filters that activate when the filters detect a specific feature at a spatial position within the input. The output volume of the convolution layer may arise out of the stacking of activation maps for each filter. The convolutional neural network may be configured to receive one or more images from the one or more image sensors as the artificial neural network input and to output a vector representing the environment parameter.

Although emphasis has been placed on artificial neural network processing of image sensor data, the artificial neural network may process other sensor data, such that a navigation decision for the robot terminal may be optionally based on image sensor data and data from one or more other sensor types. In this way, the one or more additional sensors may be configured to generate additional sensor data, and the one or more processors of the mobile communication terminal may be further configured to implement at least one additional artificial neural network to receive the additional sensor data as an additional artificial neural network input and output an additional artificial neural network output representing a detected environment parameter of the environment of the mobile communication terminal. In this manner, the one or more processors may be configured to determine the navigation instruction based on the artificial neural network output and the additional artificial neural network output. Such one or more additional sensors may include any sensors of the mobile communication terminal and/or any other additional sensors which may be configured to provide their sensor data to the mobile communication terminal through any means whatsoever. According to an aspect of the disclosure, a non-limiting list of possible additional sensors includes one or more accelerometers, one or more position sensors, one or more magnetometers, or any combination thereof.

The one or more artificial neural networks may be configured to output an environment parameter based on the image sensor data input. The environment parameter may be any factor present in or associated with an environment of the mobile communication terminal. Furthermore, because the mobile communication terminal is to be mounted on/in or otherwise physically connected to the robot terminal, the environment parameter also represents a parameter of an environment of the robot terminal. Without limitation, the environment parameter may include one or more gestures (e.g. handwaving, providing a "stop" signal with the hands, providing one or more hand signal commands, or otherwise); one or more postures (e.g. of a device, of an obstacle, or otherwise); one or more obstacles (e.g. obstacle identification, obstacle location, obstacle movements, obstacle heading, or otherwise); one or more drivable paths (navigation decisions, navigation directions, paths without obstacles, unobstructed paths, comparison of paths to determine a most favorable path, etc.); or any combinations thereof.

The navigation instruction may be understood as an instruction to direct the robot terminal's movement. The mobile communication terminal may transmit the navigation instruction (e.g. a wired connection or a wireless connection) to the robot terminal (e.g. to a microcontroller of the robot terminal). The specific format of the navigation instruction may be selected based on the microcontroller and the programming of the microcontroller, or vice versa. The navigation instruction may include a directional instruction such as move forward, move backward, turn, rotate or otherwise. The navigation instruction may include a distance, such as 10 cm, 1 meter, 10 meters, or otherwise. The navigation instruction may include a timing, such as move forward for 10 seconds, 30 seconds, one minute, or otherwise. The navigation instruction may include a plurality of commands, which may be designed to be executed serially (e.g., go forward for 1 meter, then begin turning 20 degrees, then go forward for 5 meters) or concurrently or simultaneously (go forward for 1 meter while turning 20 degrees, then go forward for 5 meters). Generally, the format of the navigation instruction is very flexible and will be determined in conjunction with the type and the programming of the microcontroller.

While the above descriptions and connected figures may depict electronic device components as separate elements, skilled persons will appreciate the various possibilities to combine or integrate discrete elements into a single element. Such combinations or integrations may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

Any of the procedures or methods described herein may be performed by a non-transitory computer readable medium, including instructions which, if executed, cause one or more processors to perform the procedures or methods described herein.

Further aspects of the disclosure are described by way of the following examples:

In Example 1, a mobile communication terminal device including: one or more image sensors, configured to generate image sensor data representing an environment of the mobile communication terminal device; one or more processors, configured to: receive the image sensor data from the one or more image sensors; implement at least one artificial neural network to receive the image sensor data as an artificial neural network input and output an artificial neural network output representing a detected environment parameter of the environment of the mobile communication terminal; determine a navigation instruction based on the artificial neural network output; and send a signal representing the navigation instruction to a robot terminal via a communication interface.

In Example 2, the mobile communication terminal of Example 1, wherein the mobile communication terminal is configured to be mounted and operated on a robot terminal.

In Example 3, the mobile communication terminal of Example 2, wherein the mounting includes co-movement of mobile communication terminal and robot terminal.

In Example 4, the mobile communication terminal of Example 2 or 3, wherein the mounting includes relative movement of mobile communication terminal in relation to robot terminal.

In Example 5, the mobile communication terminal of Example 4, wherein the relative movement includes simultaneous tilting and/or panning of the mobile communication terminal and the robot terminal.

In Example 6, the mobile communication terminal of any one of Examples 1 to 5, wherein the artificial neural network is a convolutional neural network.

In Example 7, the mobile communication terminal of Example 6, wherein the convolutional neural network is configured to receive one or more images from the one or more image sensors as the artificial neural network input and to output a vector representing the environment parameter.

In Example 8, the mobile communication terminal of any one of Examples 1 to 7, further including one or more additional sensors, configured to generate additional sensor data representing an environment of the mobile communication terminal device, and wherein the one or more processors are further configured to implement at least one additional artificial neural network to receive the additional sensor data as an additional artificial neural network input and output an additional artificial neural network output representing a detected environment parameter of the environment of the mobile communication terminal; and wherein the one or more processors are configured to determine the navigation instruction based on the artificial neural network output and the additional artificial neural network output.

In Example 9, the mobile communication terminal of Example 8, wherein the one or more additional sensors include one or more accelerometers, one or more position sensors, one or more magnetometers, or any combination thereof.

In Example 10, the mobile communication terminal of Example 8 or 9, wherein the additional sensor data include accelerometer data, location data, magnetometer data, or any combination thereof.

In Example 11, the mobile communication terminal of any one of Examples 8 to 10, wherein the one or more processors are further configured to select a subset of additional sensor data from the one or more additional sensors and to implement the additional artificial neural network to receive as an additional artificial neural network input only the subset of additional sensor data.

In Example 12, the mobile communication terminal of any one of Examples 1 to 11, wherein the one or more processors are further configured to perform one or more data pre-processing procedures on the sensor data and/or the additional sensor data before providing implementing the artificial neural network and/or the additional artificial neural network.

In Example 13, the mobile communication terminal of any one of Examples 1 to 12, wherein the environment of the mobile communication terminal device includes one or more landmarks, maps, static objects, moving objects, living beings, or any combination thereof.

In Example 14, the mobile communication terminal of any one of Examples 1 to 13, wherein the environment parameter includes one or more of gestures, one or more postures, one or more obstacles, one or more drivable paths, or any combinations thereof.

In Example 15, the mobile communication terminal of any one of Examples 1 to 14, wherein the communications interface includes a wired connection between the mobile communication terminal device and the robot terminal.

In Example 16, the mobile communication terminal of any one of Examples 1 to 15, wherein the one or more processors are further configured to receive a signal from a user-controller, the signal representing a user-navigation instruction; and adjust a weight of one or more neurons of the artificial neural network based on a difference between the navigation instruction and the user-navigation instruction.

In Example 17, a robot system including: a mobile communication terminal device including: one or more image sensors, configured to generate image sensor data representing an environment of the mobile communication terminal device; one or more processors, configured to: receive the image sensor data from the one or more image sensors; implement at least one artificial neural network to receive the image sensor data as an artificial neural network input and output an artificial neural network output representing a detected environment parameter of the environment of the mobile communication terminal; determine a navigation instruction based on the artificial neural network output; and send a signal representing the navigation instruction to a robot terminal via a communication interface, the robot terminal, including: a controller, configured to receive the signal representing the navigation instruction via the communication interface, and on the basis of the navigation instruction, generate one or more control signals for operation of a plurality of motors; and the plurality of motors, configured to generate a mechanical force in response to the one or more control signals.

In Example 18, the robot system of Example 17, wherein the mobile communication terminal is configured to be mounted and operated on a robot terminal.

In Example 19, the robot system of Example 18, wherein the mounting includes co-movement of mobile communication terminal and robot terminal.

In Example 20, the robot system of Example 18 or 19, wherein the mounting includes relative movement of mobile communication terminal in relation to robot terminal.

In Example 21, the robot system of Example 20, wherein the relative movement includes simultaneous tilting and/or panning of the mobile communication terminal and the robot terminal.

In Example 22, the robot system of any one of Examples 17 to 21, wherein the artificial neural network is a convolutional neural network.

In Example 23, the robot system of Example 22, wherein the convolutional neural network is configured to receive one or more images from the one or more image sensors as the artificial neural network input and to output a vector representing the environment parameter.

In Example 24, the robot system of any one of Examples 17 to 23, further including one or more additional sensors, configured to generate additional sensor data representing an environment of the mobile communication terminal device, and wherein the one or more processors are further configured to implement at least one additional artificial neural network to receive the additional sensor data as an additional artificial neural network input and output an additional artificial neural network output representing a detected environment parameter of the environment of the mobile communication terminal; and wherein the one or more processors are configured to determine the navigation instruction based on the artificial neural network output and the additional artificial neural network output.

In Example 25, the robot system of Example 24, wherein the one or more additional sensors include one or more accelerometers, one or more position sensors, one or more magnetometers, or any combination thereof.

In Example 26, the robot system of Example 24 or 25, wherein the additional sensor data include accelerometer data, location data, magnetometer data, or any combination thereof.

In Example 27, the robot system of any one of Examples 18 to 26, wherein the one or more processors are further configured to perform one or more data pre-processing procedures on the sensor data and/or the additional sensor data before providing implementing the artificial neural network and/or the additional artificial neural network.

In Example 28, the robot system of any one of Examples 18 to 27, wherein the environment of the mobile communication terminal device includes one or more landmarks, maps, static objects, moving objects, living beings, or any combination thereof.

In Example 29, the robot system of any one of Examples 18 to 28, wherein the environment parameter includes one or more of gestures, one or more postures, one or more obstacles, one or more drivable paths, or any combinations thereof.

In Example 30, the robot system of any one of Examples 18 to 29, wherein the communications interface includes a wired connection between the mobile communication terminal device and the robot terminal.

In Example 31, the robot system of any one of Examples 18 to 30, wherein the one or more processors are further configured to receive a signal from a user-controller, the signal representing a user-navigation instruction; and adjust a weight of one or more neurons of the artificial neural network based on a difference between the navigation instruction and the user-navigation instruction.

In Example 32, a non-transitory computer readable medium, including instructions which, if executed, cause one or more processors of a mobile communication terminal to: receive image sensor data from the one or more image sensors, wherein the image sensor data represent an environment of the mobile communication terminal; implement at least one artificial neural network to receive the image sensor data as an artificial neural network input and output an artificial neural network output representing a detected environment parameter of the environment of the mobile communication terminal; determine a navigation instruction based on the artificial neural network output; and send a signal representing the navigation instruction to a robot terminal via a communication interface.

In Example 33, the computer readable medium of Example 32, wherein the artificial neural network is a convolutional neural network.

In Example 34, the computer readable medium of Example 33, wherein the convolutional neural network is configured to receive one or more images from the one or more image sensors as the artificial neural network input and to output a vector representing the environment parameter.

In Example 35, the computer readable medium of any one of Examples 32 to 34, wherein the instructions are further configured to cause the one or more processors to implement at least one additional artificial neural network to receive additional sensor data representing an environment of the mobile communication terminal device as an additional artificial neural network input and output an additional artificial neural network output representing a detected environment parameter of the environment of the mobile communication terminal; and to determine the navigation instruction based on the artificial neural network output and the additional artificial neural network output.

In Example 36, the computer readable medium of Example 34 or 35, wherein the additional sensor data include accelerometer data, location data, magnetometer data, or any combination thereof.

In Example 37, the computer readable medium of any one of Examples 35 to 36, wherein the instructions are further configured to cause the one or more processors to select a subset of additional sensor data from the additional sensor data and to implement the additional artificial neural network to receive as an additional artificial neural network input only the subset of additional sensor data.

In Example 38, the computer readable medium of any one of Examples 32 to 37, wherein the instructions are further configured to cause the one or more processors to perform one or more data pre-processing procedures on the sensor data and/or the additional sensor data before providing implementing the artificial neural network and/or the additional artificial neural network.

In Example 39, the computer readable medium of any one of Examples 32 to 38, wherein the environment of the mobile communication terminal device includes one or more landmarks, maps, static objects, moving objects, living beings, or any combination thereof.

In Example 40, the computer readable medium of any one of Examples 32 to 39, wherein the environment parameter includes one or more of gestures, one or more postures, one or more obstacles, one or more drivable paths, or any combinations thereof.

In Example 41, the computer readable medium of any one of Examples 32 to 40, wherein the communications interface includes a wired connection between the mobile communication terminal device and the robot terminal.

In Example 42, the computer readable medium of any one of Examples 32 to 41, wherein the instructions are further configured to cause the one or more processors to receive a signal from a user-controller, the signal representing a user-navigation instruction; and adjust a weight of one or more neurons of the artificial neural network based on a difference between the navigation instruction and the user-navigation instruction.

In Example 43, a mobile communication terminal including: one or more image sensors, configured to generate image sensor data representing an environment of the mobile communication terminal device; and one or more processors, configured to: implement an artificial neural network to receive the image sensor data as an artificial neural network input and output an artificial neural network output representing a detected obstacle representing a detected environment parameter of the environment of the mobile communication terminal; determine a navigation instruction based on the artificial neural network output; receive a signal from a user-controller, the signal representing a user-navigation instruction; and adjust a weight of one or more neurons of the artificial neural network based on a difference between the navigation instruction and the user-navigation instruction.

In Example 44, the mobile communication terminal of Example 43, wherein the artificial neural network is a convolutional neural network.

In Example 45, the mobile communication terminal of Example 43 or 44, further including adjusting the weight of one or more neurons of the artificial neural network using a weighted loss function in which a weight of the loss function is proportional to a steering angle of a robot terminal to which the mobile communication terminal is connected.

In Example 46, a method of navigating a robot terminal with a mobile communication terminal including: receiving image sensor data from the one or more image sensors, wherein the image sensor data represent an environment of the mobile communication terminal; implementing at least one artificial neural network to receive the image sensor data as an artificial neural network input and to output an artificial neural network output representing a detected environment parameter of the environment of the mobile communication terminal; determining a navigation instruction based on the artificial neural network output; and sending a signal representing the navigation instruction to a robot terminal via a communication interface.

In Example 47, the method of navigating a robot terminal with a mobile communication terminal of Example 46, wherein the mobile communication terminal is configured to be mounted and operated on a robot terminal.

In Example 48, the method of navigating a robot terminal with a mobile communication terminal of Example 47, wherein the mounting includes co-movement of mobile communication terminal and robot terminal.

In Example 49, the method of navigating a robot terminal with a mobile communication terminal of Example 47 or 48, wherein the mounting includes relative movement of mobile communication terminal in relation to robot terminal.

In Example 50, the method of navigating a robot terminal with a mobile communication terminal of Example 49, wherein the relative movement includes simultaneous tilting and/or panning of the mobile communication terminal and the robot terminal.

In Example 51, the method of navigating a robot terminal with a mobile communication terminal of any one of Examples 46 to 50, wherein the artificial neural network is a convolutional neural network.

In Example 52, the method of navigating a robot terminal with a mobile communication terminal of Example 51, wherein the convolutional neural network is configured to receive one or more images from the one or more image sensors as the artificial neural network input and to output a vector representing the environment parameter.

In Example 53, the method of navigating a robot terminal with a mobile communication terminal of any one of Examples 46 to 52, further including implementing at least one additional artificial neural network to receive additional sensor data as an additional artificial neural network input and to output an additional artificial neural network output representing a detected environment parameter of the environment of the mobile communication terminal; and determining the navigation instruction based on the artificial neural network output and the additional artificial neural network output.

In Example 54, the method of navigating a robot terminal with a mobile communication terminal of Example 53, wherein the additional sensor data include accelerometer data, location data, magnetometer data, or any combination thereof.

In Example 55, the method of navigating a robot terminal with a mobile communication terminal of any one of Examples 52 to 54, further including selecting a subset of additional sensor data from the one or more additional sensors and to implement the additional artificial neural network to receive as an additional artificial neural network input only the subset of additional sensor data.

In Example 56, the method of navigating a robot terminal with a mobile communication terminal of any one of Examples 46 to 55, further including performing one or more data pre-processing procedures on the sensor data and/or the additional sensor data before providing implementing the artificial neural network and/or the additional artificial neural network.

In Example 57, the method of navigating a robot terminal with a mobile communication terminal of any one of Examples 46 to 56, wherein the environment of the mobile communication terminal device includes one or more landmarks, maps, static objects, moving objects, living beings, or any combination thereof.

In Example 58, the method of navigating a robot terminal with a mobile communication terminal of any one of Examples 46 to 57, wherein the environment parameter includes one or more of gestures, one or more postures, one or more obstacles, one or more drivable paths, or any combinations thereof.

In Example 59, the method of navigating a robot terminal with a mobile communication terminal of any one of Examples 46 to 58, wherein the communications interface includes a wired connection between the mobile communication terminal device and the robot terminal.

In Example 60, the method of navigating a robot terminal with a mobile communication terminal of any one of Examples 46 to 59, further including receiving a signal from a user-controller, the signal representing a user-navigation instruction; and adjusting a weight of one or more neurons of the artificial neural network based on a difference between the navigation instruction and the user-navigation instruction.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A mobile communication terminal device comprising:
one or more image sensors, configured to generate image sensor data representing an environment of the mobile communication terminal device;
one or more processors, configured to:
implement an artificial neural network to receive the image sensor data as an artificial neural network input and output an artificial neural network output representing a detected environment parameter of the environment of the mobile communication terminal;
determine a navigation instruction based on the artificial neural network output;
receive a signal from a user-controller, the signal representing a user-navigation instruction; and
adjust a weight of one or more neurons of the artificial neural network based on a difference between the navigation instruction and the user-navigation instruction and using a weighted loss function in which a weight of the loss function is proportional to a steering angle of a robot terminal to which the mobile communication terminal is connected.

2. The mobile communication terminal of claim 1, wherein the mobile communication terminal is configured to be mounted and operated on the robot terminal.

3. The mobile communication terminal of claim 1, wherein the artificial neural network is a convolutional neural network.

4. The mobile communication terminal of claim 3, wherein the convolutional neural network is configured to receive one or more images from the one or more image sensors as the artificial neural network input and to output a vector representing the environment parameter.

5. The mobile communication terminal of claim 1, further comprising one or more additional sensors, configured to generate additional sensor data representing an environment of the mobile communication terminal device, and wherein the one or more processors are further configured to implement at least one additional artificial neural network to receive the additional sensor data as an additional artificial neural network input and output an additional artificial neural network output representing a detected environment parameter of the environment of the mobile communication terminal; and wherein the one or more processors are configured to determine the navigation instruction based on the artificial neural network output and the additional artificial neural network output; wherein the one or more additional sensors comprise one or more accelerometers, one or more position sensors, one or more magnetometers, or any combination thereof.

6. The mobile communication terminal of claim 5, wherein the one or more processors are further configured to select a subset of additional sensor data from the one or more additional sensors and to implement the additional artificial neural network to receive as an additional artificial neural network input only the subset of additional sensor data.

7. The mobile communication terminal of claim 5, wherein the one or more processors are further configured to perform one or more data pre-processing procedures on the sensor data and/or the additional sensor data before implementing the artificial neural network and/or the additional artificial neural network.

8. The mobile communication terminal of claim 1, wherein the environment of the mobile communication terminal device comprises one or more landmarks, maps, static objects, moving objects, living beings, or any combination thereof.

9. The mobile communication terminal of claim 1, wherein the environment parameter includes one or more of gestures, one or more postures, one or more obstacles, one or more drivable paths, or any combinations thereof.

10. The mobile communication terminal of claim 1, wherein the communications interface comprises a wired connection between the mobile communication terminal device and the robot terminal.

11. A robot system comprising:
a mobile communication terminal device comprising:
one or more image sensors, configured to generate image sensor data representing an environment of the mobile communication terminal device;
one or more processors, configured to:
receive the image sensor data from the one or more image sensors;
implement at least one artificial neural network to receive the image sensor data as an artificial neural network input and output an artificial neural network output representing a detected environment parameter of the environment of the mobile communication terminal;
determine a navigation instruction based on the artificial neural network output; and
send a signal representing the navigation instruction to a robot terminal via a communication interface,
wherein the one or more processors are further configured to receive a signal from a user-controller, the signal representing a user-navigation instruction; and
adjust a weight of one or more neurons of the artificial neural network based on a difference between the navigation instruction and the user-navigation instruction using a weighted loss function in which a weight of the loss function is proportional to a steering angle of a robot terminal to which the mobile communication terminal is connected,
the robot terminal, comprising:
a controller, configured to receive the signal representing the navigation instruction via the communication interface, and on the basis of the navigation instruction, generate one or more control signals for operation of a plurality of motors; and
the plurality of motors, configured to generate a mechanical force in response to the one or more control signals.

12. The robot system of claim 11, wherein the mobile communication terminal is configured to be mounted and operated on the robot terminal.

13. The robot system of claim 11, further comprising one or more additional sensors, configured to generate additional sensor data representing an environment of the mobile communication terminal device, and wherein the one or more processors are further configured to implement at least one additional artificial neural network to receive the additional sensor data as an additional artificial neural network input and output an additional artificial neural network output representing a detected environment parameter of the environment of the mobile communication terminal; and wherein the one or more processors are configured to determine the navigation instruction based on the artificial neural network output and the additional artificial neural network output.

14. The robot system of claim 13, wherein the one or more additional sensors comprise one or more accelerometers, one or more position sensors, one or more magnetometers, or any combination thereof.

15. The robot system of claim 11, wherein the user navigation instruction is a user-inputted instruction for the robot terminal to travel.

16. A non-transitory computer readable medium, comprising instructions which, if executed, cause one or more processors of a mobile communication terminal to:

implement an artificial neural network to receive the image sensor data as an artificial neural network input and output an artificial neural network output representing a detected environment parameter of the environment of the mobile communication terminal;

determine a navigation instruction based on the artificial neural network output;

receive a signal from a user-controller, the signal representing a user-navigation instruction; and adjust a weight of one or more neurons of the artificial neural network based on a difference between the navigation instruction and the user-navigation instruction and using a weighted loss function in which a weight of the loss function is proportional to a steering angle of a robot terminal to which the mobile communication terminal is connected.

17. The computer readable medium of claim 16, wherein the artificial neural network is a convolutional neural network.

18. The computer readable medium of claim 17, wherein the convolutional neural network is configured to receive one or more images from the one or more image sensors as the artificial neural network input and to output a vector representing the environment parameter.

* * * * *